(12) United States Patent
Ormesher et al.

(10) Patent No.: US 9,429,644 B1
(45) Date of Patent: Aug. 30, 2016

(54) SUBAPERTURE CLUTTER FILTER WITH CFAR SIGNAL DETECTION

(71) Applicant: Sandia Corporation, Albuquerque, NM (US)

(72) Inventors: Richard C. Ormesher, Albuquerque, NM (US); Richard M. Naething, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 446 days.

(21) Appl. No.: 14/052,901

(22) Filed: Oct. 14, 2013

(51) Int. Cl.
  *G01S 7/41* (2006.01)
  *G01S 7/35* (2006.01)
  *G01S 13/34* (2006.01)

(52) U.S. Cl.
  CPC .............. *G01S 7/414* (2013.01); *G01S 7/354* (2013.01); *G01S 13/348* (2013.01)

(58) Field of Classification Search
  CPC ....... G01S 7/414; G01S 7/354; G01S 13/348
  USPC ........................................................ 342/161
  See application file for complete search history.

(56) References Cited

U.S. PATENT DOCUMENTS

| | | | |
|---|---|---|---|
| 5,486,830 A | 1/1996 | Axline, Jr. et al. | |
| 6,577,266 B1 * | 6/2003 | Axline | G01S 13/9029 342/42 |
| 7,460,059 B1 * | 12/2008 | Ormesher | G01S 7/292 342/159 |
| 7,812,758 B2 | 10/2010 | Morris | |
| 2010/0033367 A1 | 2/2010 | Hellsten et al. | |
| 2011/0298654 A1 | 12/2011 | Hellsten | |
| 2012/0105276 A1 | 5/2012 | Ryland | |

OTHER PUBLICATIONS

Deng, et al., "Clutter Reduction for Synthetic Aperture Radar Imagery Based on Adaptive Wavelet Packet Transform", Progress in Electromagnetics Research (PIER), 2000, vol. 29, pp. 1-23.

* cited by examiner

*Primary Examiner* — Peter Bythrow
*Assistant Examiner* — Helena Seraydaryan
(74) *Attorney, Agent, or Firm* — Medley, Behrens & Lewis, LLC

(57) ABSTRACT

The various technologies presented herein relate to the determination of whether a received signal comprising radar clutter further comprises a communication signal. The communication signal can comprise of a preamble, a data symbol, communication data, etc. A first portion of the radar clutter is analyzed to determine a radar signature of the first portion of the radar clutter. A second portion of the radar clutter can be extracted based on the radar signature of the first portion. Following extraction, any residual signal can be analyzed to retrieve preamble data, etc. The received signal can be based upon a linear frequency modulation (e.g., a chirp modulation) whereby the chirp frequency can be determined and the frequency of transmission of the communication signal can be based accordingly thereon. The duration and/or bandwidth of the communication signal can be a portion of the duration and/or the bandwidth of the radar clutter.

20 Claims, 15 Drawing Sheets

SUBAPERTURE CLUTTER FILTER WITH CFAR SIGNAL DETECTION

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Synthetic aperture radar (SAR) is a radar technique whereby a radar system moves relative to a target region, e.g., a radar antenna is located on an aircraft flying over a target region of interest. In conjunction with transmission and reception of electromagnetic radiation utilized for radar signaling (e.g., radar waves), the antenna can also be utilized to transmit and receive electromagnetic radiation for communication between the aircraft and another system (e.g., a ground based transmitter). Simultaneous SAR imaging and radio-frequency (RF) communication involves collecting data with the airborne radar platform while a ground based transmitter is simultaneously communicating to the radar antenna in a portion of the electromagnetic spectrum which can overlap an operating range of the radar. Hence, signaling received at the radar antenna can comprise a combination of radar clutter and a communication signal. The concepts presented supra are illustrated in FIG. 21, where an aircraft 2110, equipped with a radar antenna system 2120 is flying over a target terrain 2140, where the target terrain can also include man-made structures/buildings such as a transmission structure 2160. Radar waves 2130 are being transmitted from antenna system 2120, and reflected radar waves 2150 (e.g., reflected off of terrain 2140, structure 2160, etc.) are reflected back to antenna system 2120. As well as antenna system 2120 receiving reflected radar signals 2150, antenna system 2120 can also simultaneously receive communication signal 2170 transmitted from transmission structure 2160. However, the radar clutter return (e.g., radar waves 2150) can appear as noise or interference on the communication channel (e.g., communication signal 2170) and can thus effect a reduction in the performance of the communication channel. It is to be appreciated that transmission structure 2160 can be any suitable system, such as the previously mentioned transmission tower, as well as a vehicle based system, a portable system (e.g., carried by military personnel), etc.

SUMMARY

The following is a brief summary of subject matter that is described in greater detail herein. This summary is not intended to be limiting as to the scope of the claims.

Various exemplary embodiments presented herein relate to determining an existence of a communication signal associated with a received signal further comprising radar clutter. In an exemplary embodiment, a signal detection system can be configured to receive a signal comprising a combination of a communication signal and radar clutter. In an embodiment, the communication signal can have a frequency configured in accordance with a frequency of a radar transmission signal originating the radar clutter.

Another exemplary embodiment is presented which comprises a method for determination of a radar signature and based thereon, determining whether a communication signal exists. The method comprising extracting a communication signal from a signal being received, wherein the received signal further comprises radar clutter. In an embodiment, the communication signal can be band-limited according to at least one parameter associated with the radar clutter.

A further exemplary embodiment for determination of the existence of a communication signal in a signal further comprising radar clutter can comprise a memory that includes instructions that, when executed by a processor of the radar system, cause the processor to perform acts comprising receiving a signal comprising radar clutter and a communication signal. In a further embodiment, the acts include generating a first subaperture comprising a first portion of the radar clutter, and further, generating a second subaperture comprising the communication signal and a second portion of the radar clutter, wherein the first subaperture has a same area as the second subaperture. In a further embodiment, the acts can include determining a signature of the first portion of the radar clutter, and in a further embodiment, filtering the second subaperture with the first portion signature to facilitate removal of the second portion of the radar clutter from the second aperture facilitating identifying an existence of the communication signal in the second aperture.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
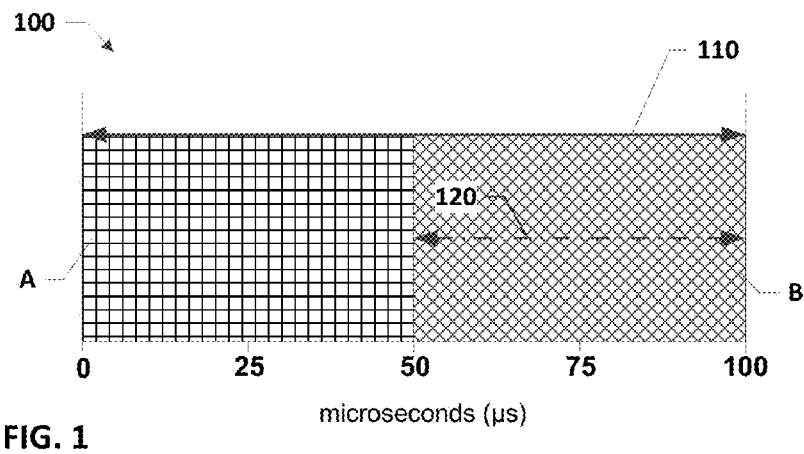
FIG. 1 is a block diagram illustrating an exemplary embodiment of a signal comprising both radar clutter and a communication signal.

Various technologies pertaining to determination of a communication signal being included in signaling comprising radar clutter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

The term "or" is intended herein to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 2:
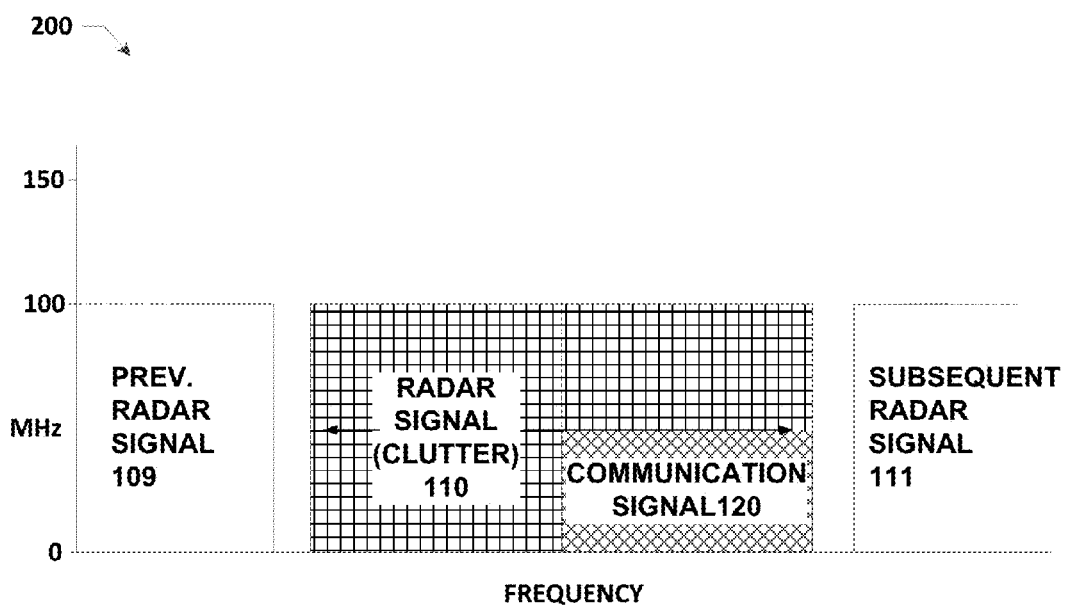
FIG. 2 is a block diagram illustrating an exemplary embodiment of a signal comprising both radar clutter and a communication signal.

FIGS. 1 and 2 illustrate representations 100 and 200 presenting a relationship between a radar signal and a communication signal, according to one or more embodiments. In the embodiment presented in FIG. 1, a radar signal 110 (e.g., a linear frequency modulated signal, a chirp signal) is configured to have a duration of 100 microseconds (μs) while a communication signal 120 (aka a communications channel, RF signaling) is configured with a duration having a portion of the duration of radar signal 110. In the embodiment illustrated in FIG. 1, communication signal 120 is configured to have a duration of 50 μs and is further positioned, timewise, to reside in the second half portion of the extant radar signal 110. Hence, as shown, regions A and B both comprise of signaling having radar clutter 110, while region B further comprises a communication signal 120 (e.g., RF signaling) in combination with the radar signaling clutter 110. Various embodiments presented herein describe various techniques and approaches to facilitate determination of the existence of communication signal 120 and further, to enable extraction of data/information included in the communication signal 120 from the radar clutter 110.

Figure 3:
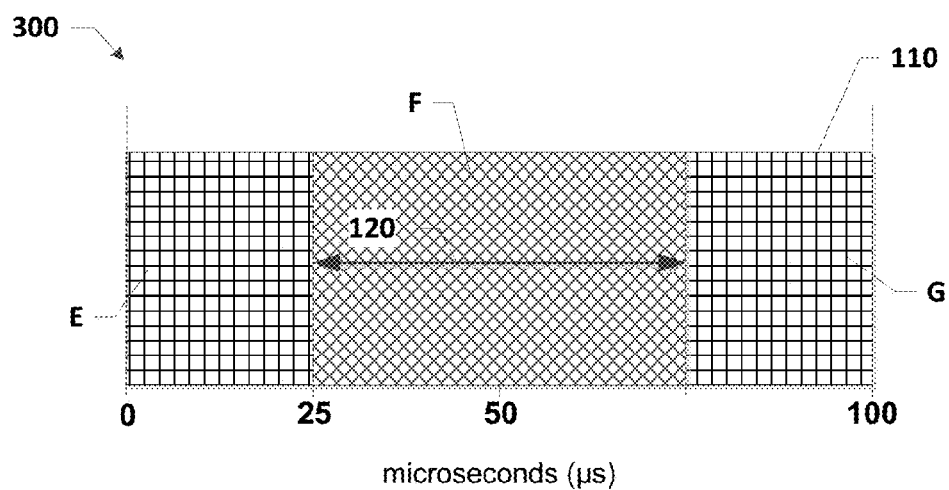
FIG. 3 is a block diagram illustrating an exemplary embodiment of a signal comprising both radar clutter and a communication signal.

It is to be appreciated that while FIG. 1 illustrates communication signal 120 to be located timewise in the second half of the duration of radar signal 110, the various embodiments presented herein are not so limited and the communication signal 120 can be located at any point relative to the temporal existence of radar signal 110. For example, turning briefly to FIG. 3, communication signal 120 can be located in the central portion of radar signal 110. As shown in FIG. 3, regions E and G comprise of radar clutter 110 only, while central region F comprises of both communication signaling 120 and radar clutter 110.

It is to be further appreciated that while FIG. 1 illustrates communication signal 120 having a duration of half of that of the duration of the radar signal 110 (e.g., 50 μs versus 100 μs), the various embodiments presented herein are not so limited and the communication signal 120 can be of any duration relative to the duration of the radar signal 110 (e.g., 20 μs versus 100 μs, 50 μs versus 80 μs, 10 μs versus 90 μs, etc.). Furthermore, it is to be appreciated that while FIG. 1 illustrates radar signal 110 having a duration of 100 μs and communication signal 120 having a duration of 50 μs, the respective duration of each of the radar signal 110 and the communication signal 120 can be of any length. In an embodiment, the duration of the communication signal 120 can be less than the duration of the radar signal 110. In another embodiment, the duration of the radar signal 110 can be of a duration greater than the duration of the communication signal 120 duration to facilitate determination of a portion of signaling only comprising radar signal (e.g., only radar signal clutter) from which a comparison of the radar signal (e.g., regions A and B) with the signaling portion comprising radar signal and communication signaling (e.g., region C).

Turning to FIG. 2, the respective bandwidths of the radar signal and the communication signal are presented. In an embodiment, the respective signal bandwidths of radar signal 110 and communication signal 120 can be of any required magnitude. For example, as shown in FIG. 2, the bandwidth of radar signal 110 can be 100 megahertz (MHz) while the bandwidth of the communication signal 120 can be of a lesser magnitude, e.g., 50 MHz. As illustrated in FIG. 2, radar signal 110 can be operating as a chirp with radar signal 110 located in a stream of radar chirps, i.e., between a previous radar chirp 109 and a subsequent radar chirp 111.

Figure 21:
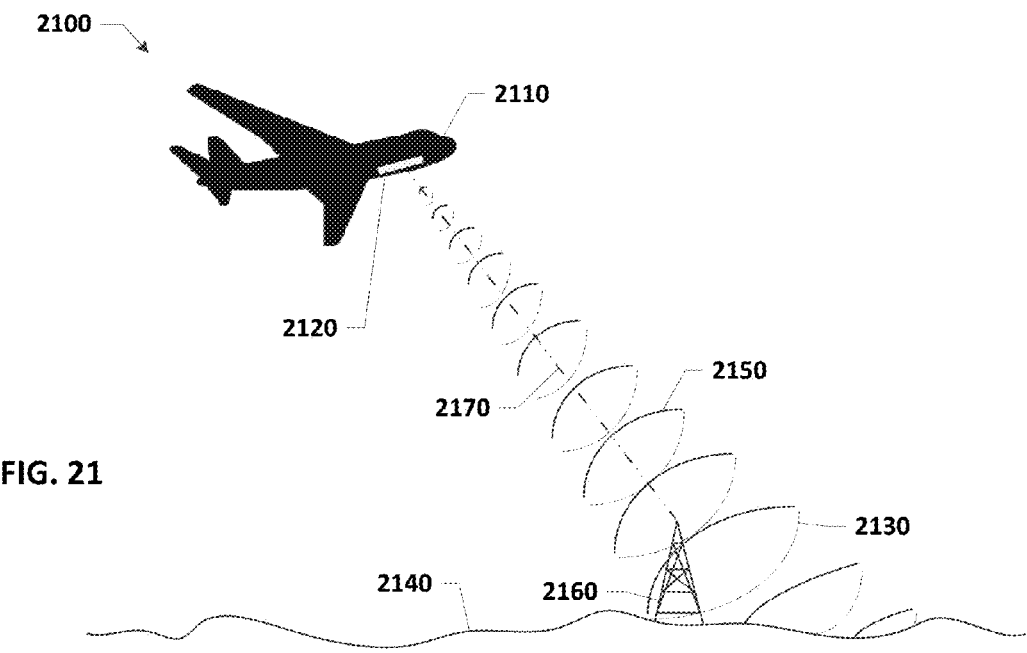
FIG. 21 illustrates a system for generating and capturing signals comprising radar signaling and communication signaling.

Hence, as illustrated in FIGS. 1 and 2, in conjunction with reference to FIG. 21, the various embodiments presented herein relate to identifying signaling which comprises a radar signal only, and based on such identification, extracting (aka filtering) the radar signal from signaling comprising both radar signal and communication signal to facilitate identification of the existence of a communication signal and further, to determine the data included in the communication signal. Such data included in a communication signal can be any of an initial indicator (e.g., a header data packet or a preamble data packet) indicating that communication data is to follow in one or more subsequent communication signals, an end-of-transmission signal, or the data can be any information conveyed between a transmitter (e.g., ground station 2160) and an antenna (e.g., antenna 2120). A communication signal to be transmitted from a communication apparatus to a radar apparatus can comprise of a preamble followed by data symbols.

As further explained herein, filtering the radar clutter from a communications channel can facilitate provision of constant false alarm rate (CFAR) for detection of a preamble communication, and can further discriminate between a communication signal and normal radar clutter return. As conveyed in FIG. 1, in an embodiment, a band-limited communication transmitter can be utilized, where the band-limited communication transmitter can be configured to enable generation of multiple subaperture data sets at the radar. In an embodiment, by utilizing a transmitter that is RF band limited, the data support of a communications signal within a phase history domain is also limited in the range direction which enables generation of a plurality of subapertures, where each subaperture can have a unique signal response. Further, the various embodiments presented herein can be implemented in any suitable radar signaling system, where such signaling system can include a single antenna system in conjunction with low pulse repetition intervals as utilized in SAR imaging.

Figure 4:
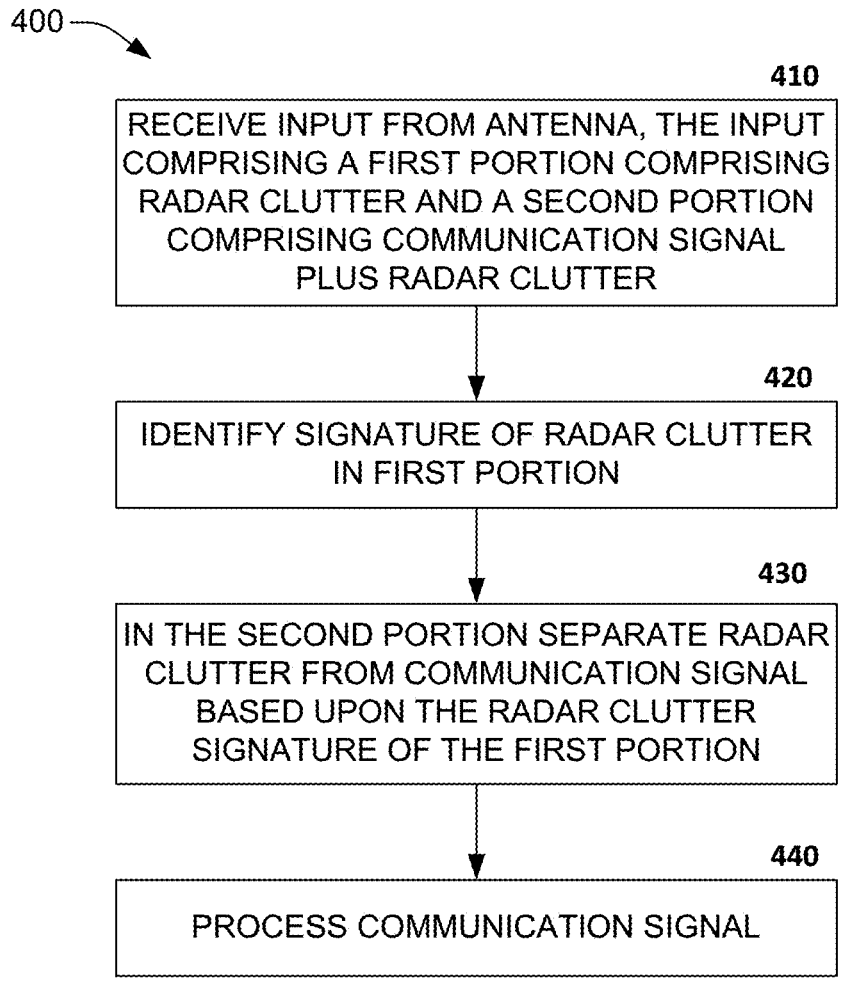
FIG. 4 is a flow diagram illustrating an exemplary methodology for detecting and extracting a communication signal from radar clutter.
Figure 5:
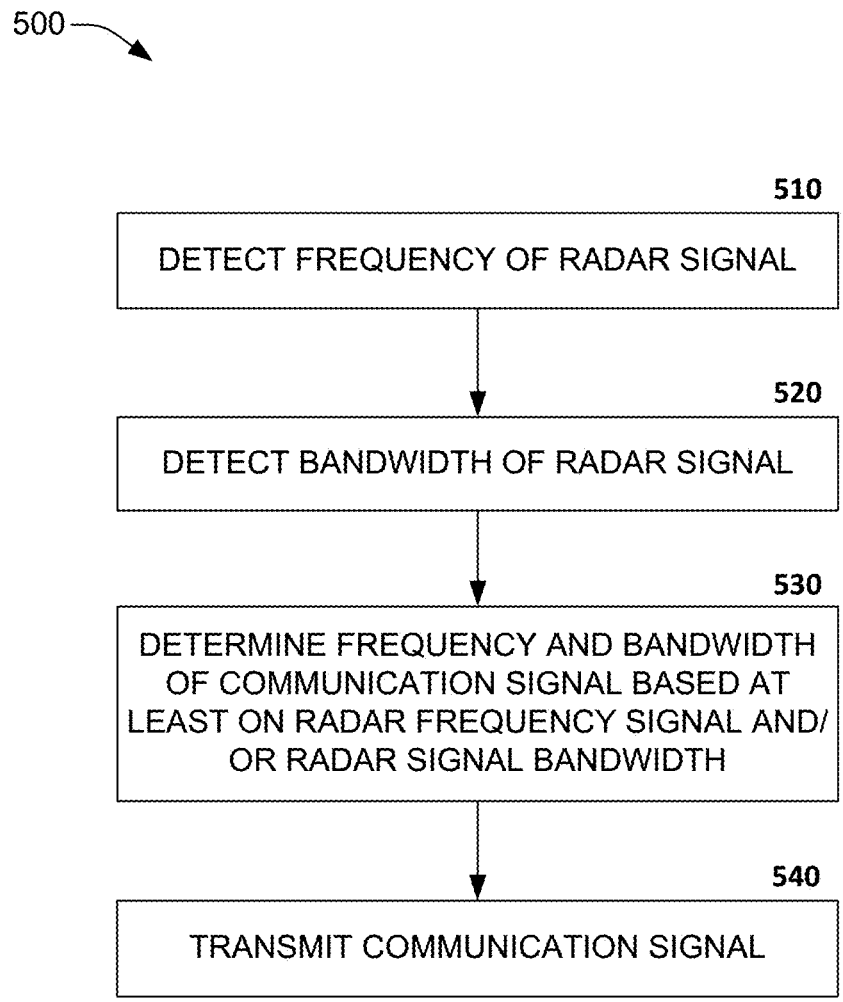
FIG. 5 is a flow diagram illustrating an exemplary methodology for detecting and extracting a communication signal from radar clutter.
Figure 6:
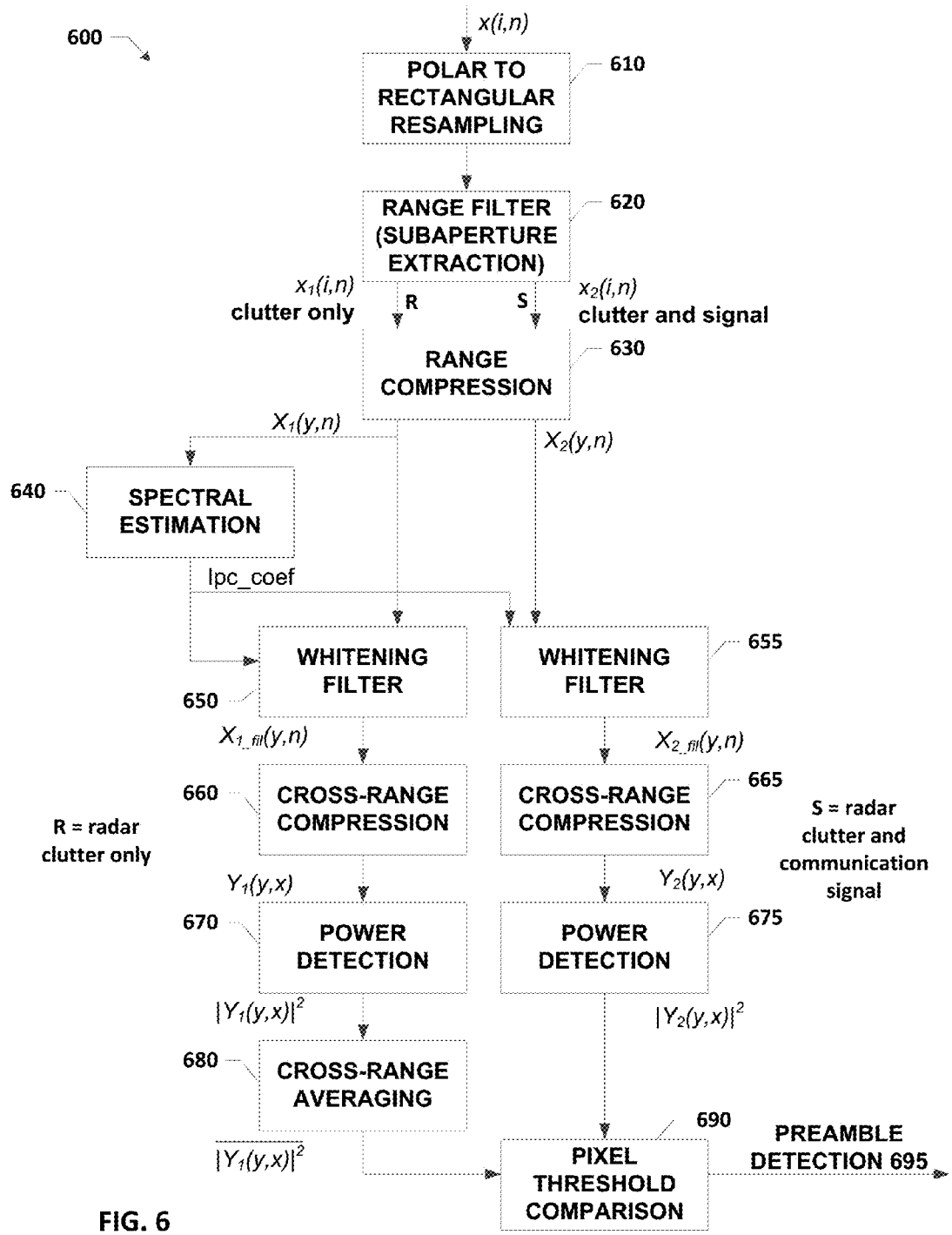
FIG. 6 is a flow diagram illustrating an exemplary methodology for detecting and extracting a communication signal from radar clutter.

FIGS. 4-6 illustrate exemplary methodologies relating to determination of a communication signal in signaling comprising radar clutter. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 4 presents an exemplary, high-level methodology relating to extracting a radar signal from signaling comprising both radar signaling and communication signaling to facilitate identification of the existence of a communication signal. At 410 a signal can be received from an antenna, whereby the signal can comprise of a first portion comprising a radar signal and a second portion comprising a combination of a radar signal and a communication signal. As previously mentioned, the communication signaling received at the antenna can be received from a band-limited communication transmitter which can be configured to enable generation of multiple subaperture data sets at the radar. Hence, transmission of the second portion (e.g., the communication signal) can be configured in accordance with the rate of transmission the first portion (e.g., the chirp rate of transmission of the radar signal from the antenna).

At 420, as described further herein, the radar signal can be identified (e.g., the radar signature) in the first portion of the radar signal/communication signal transmission received as an input at the antenna. Once the radar signal signature is known, the signature can act as a foundation against which existence of a communication signal can be determined.

At 430, based on determining the radar signal signature in the first portion, an equivalent signature (e.g., noise, clutter, etc.) can be filtered from the second portion. Any signaling (e.g., signal residue) remaining after the first radar signature has been filtered from the second portion can be considered to be the communication signal. In an embodiment, the magnitude of the communication signal bandwidth can be of a magnitude to facilitate determination of the existence of the communication signal. For example, even though the first radar signature has been determined with regard to noise, clutter, etc., the magnitude of the communication signal bandwidth is of a sufficient magnitude to facilitate detection relative to the first radar signature. For example, in an embodiment, the first radar signature is of a magnitude of 100 MHz, while the communication signal has a magnitude of 50 MHz.

At 440, the communication signal can be processed. In an embodiment, the communication signal can be a preamble signal indicating that a communication is to follow. In another embodiment, the communication signal can comprise of all, or a portion, of a communication being transmitted to an antenna system, e.g., the communication signal comprises all, or a portion, of the data symbols to be transmitted to an antenna system. The acts presented in FIG. 4 are further expanded upon with reference to FIG. 6.

FIG. 5 illustrates an exemplary methodology relating to band-limited communication between a communication apparatus and a radar system. At 510, a radar signal can be received at a communication apparatus, e.g., the radar signal is transmitted as a process to illuminate a target region. Based upon receipt of the radar signal, the frequency of transmission (e.g., chirp rate) can be determined by the communication apparatus.

At 520, the communication apparatus can further determine the bandwidth of the radar signal.

At 530, based upon at least one of the frequency of the radar signal, the bandwidth of the radar signal, or other parameter associated with the radar signal, the properties of the communication signal to be communicated from the communication apparatus to the antenna system can be configured. For example, where the bandwidth of the radar signal is determined to be 100 MHz, where a radar signal to communication signal bandwidth ratio is to be configured at 2:1, then the communication signal can be configured with a bandwidth of 50 MHz. Further, where the radar signal is identified to have a duration of X μs and a transmit frequency of Y then the communication signal can be configured to have a duration of N μs and transmission of the communication signal initiates relative to transmission of the radar signal (e.g., at half of the duration X for the communication signal to be combined with the radar signal for the second half of the existence of the radar signal). Hence, the communication signal can be configured to have a frequency and/or a duration to facilitate location of the communication signal in a portion of a radar signal reflected back to the antenna system.

At 540, the communication signal can be transmitted from the communication apparatus in accordance with the determined parameters of the reflected radar signal.

FIG. 6 illustrates an exemplary model 600 for determining the presence of a communication signal in a radar signal, and extracting the communication signal from the radar signal clutter. FIG. 6 can be read in conjunction with FIGS. 7-9, and further to aid readability the respective stages presented in FIG. 6 are presented supra as sub-sections identified with sub-headings. And to further aid readability various parameters and their respective transformations are also indicated for cross-reference to the various equations presented herein.

An overview of model 600 is briefly presented and further expanded upon in the sub-sections. At 610, initially phase history data (e.g., polar data comprising radar clutter and a communication signal) can be resampled to lie on a rectangular grid. At 620, the phase history data is subsequently filtered (e.g., in the range dimension) to create two subapertures, a first subaperture and a second subaperture. The first subaperture can include only radar clutter return (aka clutter-only data) while the second subaperture can include radar clutter return and a communications signal (aka clutter-and-signal data). At 630, a Fourier transform can be subsequently applied to the first subaperture and the second subaperture in the range dimension, generating range compressed data. A first range compressed data set (FIG. 6, element R) contains clutter data only, and a second range compressed data set (FIG. 6, element S) contains clutter-and-signal data. At 640, spectral estimation in the cross-range dimension can be further applied to the clutter-only range compressed data, element R. Spectral estimation in the cross-range dimension facilitates clutter spectral estimation for the corresponding clutter-and-signal range compressed data, element S. At respective acts 650 and 655, a filter (e.g., a whitening filter), in the cross-range dimension, can then be applied to both range compressed data sets, elements R and S. At respective acts 660 and 665, a Fourier transform can be applied in the cross-range dimension to both data sets (elements R and S) to facilitate creating two respective SAR images, a first SAR image for the radar clutter data (element R) and a second SAR image for the radar clutter-and-signal data (element S). At 670 and 675, the first SAR image and the second SAR image can be subsequently power detected. At 680, the first SAR image, the clutter-only power detected SAR image, can then be averaged in the cross-range dimension. At 690, a communications signal (e.g., a preamble signal, data symbols) can be detected in the clutter-and-signal image by setting a CFAR threshold and further, by comparing pixel to pixel the power detected clutter-and-signal SAR image to the power averaged clutter-only SAR image. At 695, detection of the communications signal can be indicated, e.g., by a notification, by forwarding of data comprising the communication signal, determining presence of a preamble, analysis of data symbols comprising the communication signal, etc.

Signal Model after Deramp Processing

Figure 7:
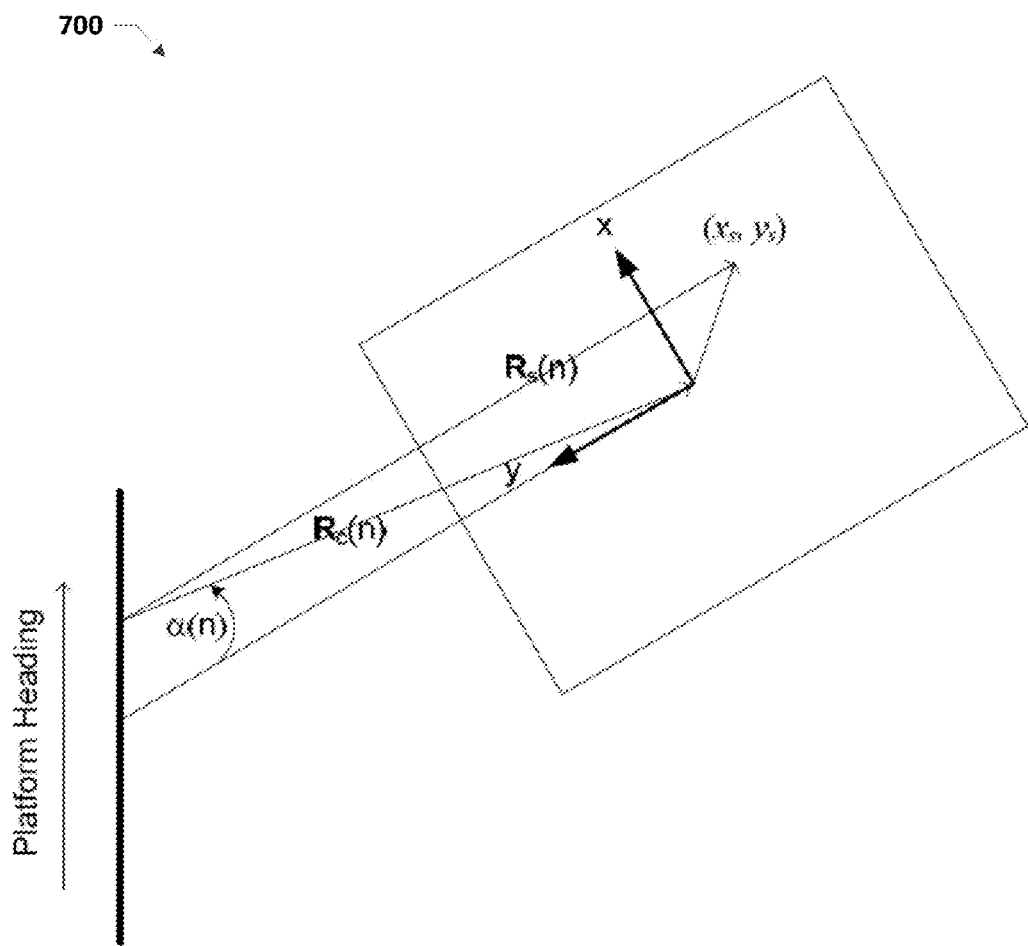
FIG. 7 is a block diagram illustrating an exemplary geometry of a signal comprising both radar clutter and a communication signal.

In an embodiment, a signal received at an antenna (e.g., antenna 2120) can comprise of a radar return signal (e.g., radar waves or clutter 2150) from a point target and further a communication signal (e.g., signal 2170) simultaneously received on the communications channel. In a further embodiment, the radar signal can be linear frequency modulated and the communications signal can be designed to match the RF center frequency and the chirp rate of the transmitted radar signal. In another embodiment, the communications transmitter can be located at the same position as the point target. The geometry for a signal model according to the various embodiments presented herein, is illustrated in FIG. 7. At the radar (e.g., antenna 2120), the received signal can be deramped and sampled.

Figure 8:
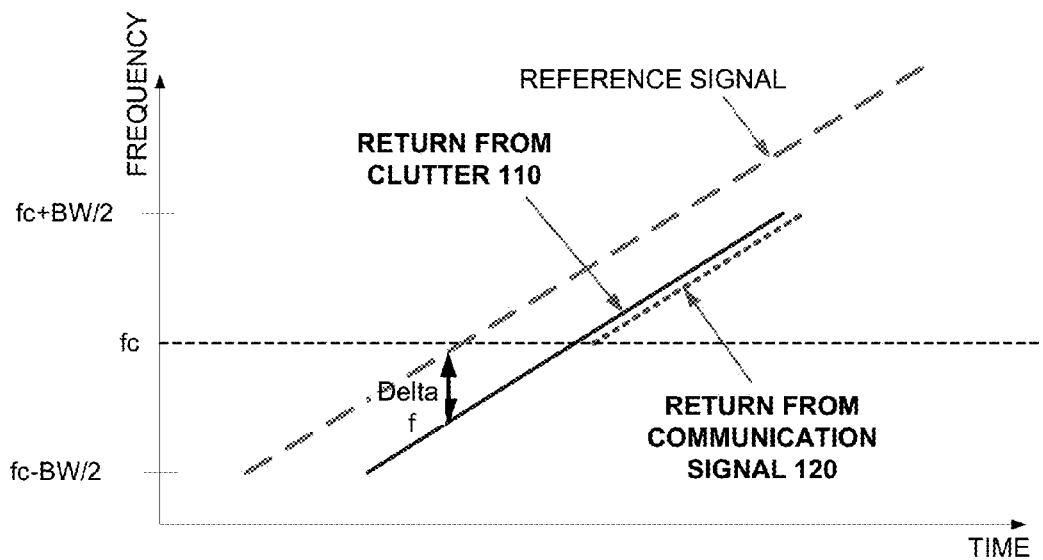
FIG. 8 is a block diagram illustrating an exemplary embodiment of a signal comprising both radar clutter and a communication signal prior to deramp processing.
Figure 9:
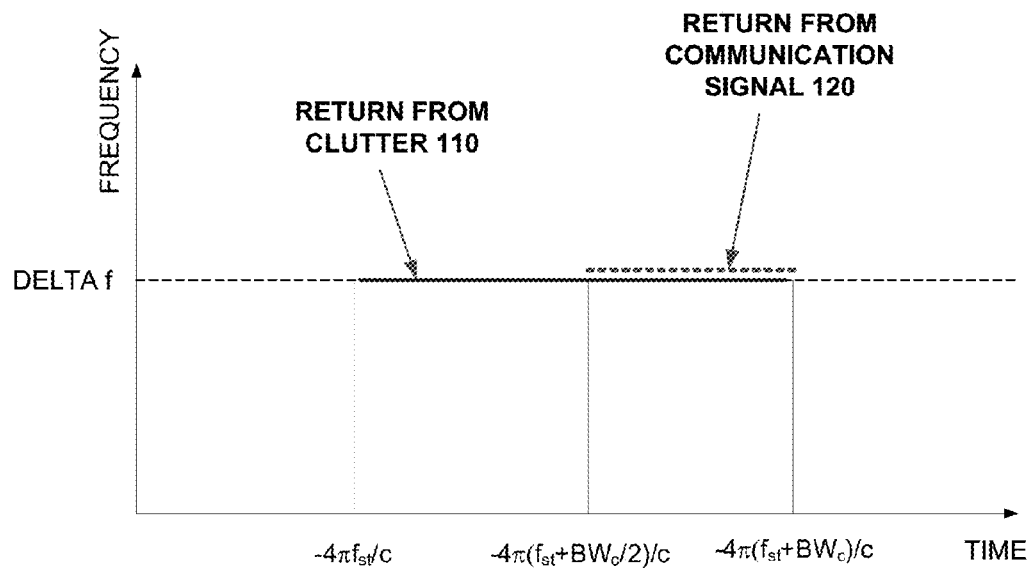
FIG. 9 is a block diagram illustrating an exemplary embodiment of a signal comprising both radar clutter and a communication signal after deramp processing.

The return signal before and after deramp processing is illustrated in FIGS. 8 and 9. FIG. 8 illustrates a return signal comprising both radar clutter 110 and a communication signal 120. In an embodiment, the communications signal 120 can have an RF bandwidth that is less than the radar clutter return 110. The reference signal is a replica of the radar transmit signal that is delayed in time to match the time delay of a radar return from a known and fixed geographical reference point.

The received signal is mixed with the complex conjugate of the reference function to perform the deramp processing as shown in FIGS. 8 and 9. As illustrated, in an embodiment, the radar clutter return 110 can have a longer time (also called spatial frequency) extent then the communications signal 120. The sampled deramped received signal is given as:

$$x(i,n) = x_t(i,n) + x_c(i,n) \quad \text{Eqn. 1}$$

where i is the fast time analog/digital (A/D) sample index, n is the radar pulses index, $x_t$ is the deramped signal return of the transmitted radar pulse, and $x_c$ is the deramped received communications signal.

Further the reference signal 910 is, $$x_{ref}(i,n) = \exp\left(j\left[2\pi f_c\left(iT_{ad} - \frac{2R_c(n)}{c}\right) + \gamma\left(iT_{ad} - \frac{2R_c(n)}{c}\right)^2\right]\right) \quad \text{Eqn. 2}$$

where $R_c(n)$ is the distance from the antenna phase center to a known and fixed geographical reference point at the $n^{th}$ transmitted radar pulse (as illustrated in FIG. 7).

After mixing the received RF signal with Eqn. 2, the received radar signal at the A/D output is expressed as:

$$x_t(i,n) = A_t \exp(j \cdot \theta_t(i,n)) \quad \text{Eqn. 3}$$

where $$\theta_t(i,n) = \frac{-4\pi}{c}(f_{st} + \gamma T_{ad} i) R_{sc}(n), \text{ for } 0 < i < N_s - 1 \quad \text{Eqn. 4}$$

and c is the speed of light in meters/second, $f_{st}$ is the start frequency of the deramped radar return pulse (aka signal) in Hertz (Hz), γ is the chirp rate in Hz/sec, $T_{ad}$ is the A/D sample rate in seconds and $R_{sc}$ is the differential distance given by:

$$R_{sc}(n) = R_s(n) - R_c(n) \quad \text{Eqn. 5}$$

where $R_s(n)$ is the distance between the antenna phase center and the point target location at the $n^{th}$ transmitted radar pulse (as illustrated in FIG. 7).

It is to be noted that the spatial-frequency of the received radar signal is given as:

$$\frac{-4\pi}{c}(f_{st} + \gamma T_{ad} i) \quad \text{Eqn. 6}$$

and is in units of radians/meter.

The RF bandwidth of the radar pulse, in Hz, is:

$$BW_t = \gamma T_{ad}(N_s - 1) \quad \text{Eqn. 7}$$

where $N_S$ is the total number of A/D samples.

The signal return of the communications signal transmitted from the same locations is:

$$x_c(i,n) = A_c \exp(j \cdot \theta_c(i,n)) \quad \text{Eqn. 8}$$

where $A_c$ is the signal amplitude and $\theta_c$ is the phase term of the received communications signal, respectively.

The bandwidth of the received signal can be selected such that the data support for the receive signal, in spatial frequency, can be divided into two separate sets or subapertures in the range dimension. One such subaperture contains signal return from only the point target (i.e., radar clutter) the other subaperture contains signal return from both the radar clutter return and the communications signal.

In an embodiment, the RF bandwidth of the communication signal 120 can be configured to be ½ the radar pulse bandwidth of the radar clutter 110, and thus, the communication signal 120 is designed such that the received phase term, $\theta_c$, is:

$$\theta_c(i,n) = 0 \quad \text{for } 0 < i < \frac{N_s}{2} \quad \text{Eqn. 9}$$

$$\theta_c(i,n) = \frac{-4\pi}{c}(f_{st} + \gamma T_{ad} i) R_{sc} \quad \text{for } \frac{N_s}{2} < i < N_s \quad \text{Eqn. 10}$$

The starting spatial-frequency of the received communication signal is:

$$f_{st\_c} = \frac{-4\pi}{c}\left(f_{st} + \gamma T_{ad}\frac{N_s}{2}\right) \quad \text{Eqn. 11}$$

and the RF bandwidth is:

$$BW_c = \gamma T_{ad}\frac{N_s}{2} \quad \text{Eqn. 12}$$

Polar to Rectangular Resampling

This subsection can be read in conjunction with FIG. 6, element 610. An initial step in processing the received data is to perform polar to rectangular resampling. The received signal is resampled such that the phase history, in the spatial-frequency domain, is sampled on a rectangular grid. $R_{sc}$ can be approximated as:

$$R_{sc} \approx \sin\alpha(n)x_t - \cos\alpha(m)y_t, \quad \text{Eqn. 13}$$

where $\alpha(n)$ is the angle between the reference pointing vector at the center of the aperture and the pointing vector at the $n^{th}$ pulse (as illustrated in FIG. 7). The coordinates $\{x_s, y_s\}$ are the x, y coordinates from the reference point to the target point (as illustrated in FIG. 7).

In the range or fast time dimension, a resampling operation can be performed such that the sample interval $\gamma T_{ad} i$ is replaced with the sample interval $$\frac{\gamma T_{ad} i}{\cos\alpha(n)}.$$

In the slow-time or cross-range dimension, for each row in fast time, i, a resampling operation can be performed such that the sample interval $$\frac{\gamma T_{ad} i \sin\alpha(n)}{\cos\alpha(n)}$$

is replaced with $\delta k_x n$. After resampling onto the rectangular grid, the phase of the clutter return can be:

$$\theta_t(i,n) = K_y(i)y_s + K_x(n)x_s \quad \text{Eqn. 14}$$

where $$K_y(i) = \frac{-4\pi}{c}f_{st} + \delta k_y i, \quad \text{for } 0 \le i \le N_{Ky} - 1 \quad \text{Eqn. 15}$$

$$K_x(n) = \frac{-\Delta K_x}{2} + \delta k_x n, \quad \text{for } 0 \le n \le N_{Kx} - 1 \quad \text{Eqn. 16}$$

$$\delta k_y = \frac{-4\pi\gamma T_{ad}}{c} \quad \text{Eqn. 17}$$

$$\Delta K_y = \delta k_y (N_{Ky} - 1) \quad \text{Eqn. 18}$$

$$\Delta K_x = \frac{-4\pi f_{st}}{c}\left(\frac{\sin(\alpha(N_s))}{\cos(\alpha(N_s))}\right) \quad \text{Eqn. 19}$$

$$\delta k_x = \frac{\Delta K_x}{N_{kx} - 1} \quad \text{Eqn. 20}$$

where $N_{kx}$ and $N_{ky}$ can be chosen based on the desired sampling in the spatial domain.

The phase response of the communications signal after resampling can be:

$$\theta_c(i,n) \approx K(i)y_s + K_x(n)x_s \text{ for } \begin{aligned}N_{Ki} &\le i \le N_{Ky} - 1 \\ 0 &\le n \le N_{Kx} - 1\end{aligned} \quad \text{Eqn. 21}$$

and zero elsewhere.

The range bandwidth, in spatial frequency, for the communications signal 120 (Eqn 21) can be approximated as:

$$\Delta K_y = \frac{-4\pi}{c}\left(f_{st} + \gamma T_{ad}\frac{N_s}{2}\right) \quad \text{Eqn. 22}$$

The lower limit on the index in Eqn 21 can be:

$$N_{Kl} = \frac{-4\pi}{c}\left(f_{st} + \gamma T_{ad}\frac{N_s}{2}\right) / \delta k_y \quad \text{Eqn. 23}$$

Again, it is to be noted that the bandwidth of the communication signal 120 can be selected such that the data support for the receive signal can be divided into two separate sets or subapertures in the range dimension. A first subaperture 1010 can contain a signal return from only the point target (e.g., returned radar signal 110). A second subaperture 1020 can contain a signal return from both the radar clutter return 110 and the communication signal 120.

Range Filtering

This subsection can be read in conjunction with FIG. 6, element 620. Subsequently, the phase data can be filtered in range by applying a simple brick wall filter in the $K_y$ domain. In an embodiment, the filtering can be accomplished by extracting the two separate subapertures 1010 and 1020 from the resampled phase history data.

Figure 10:
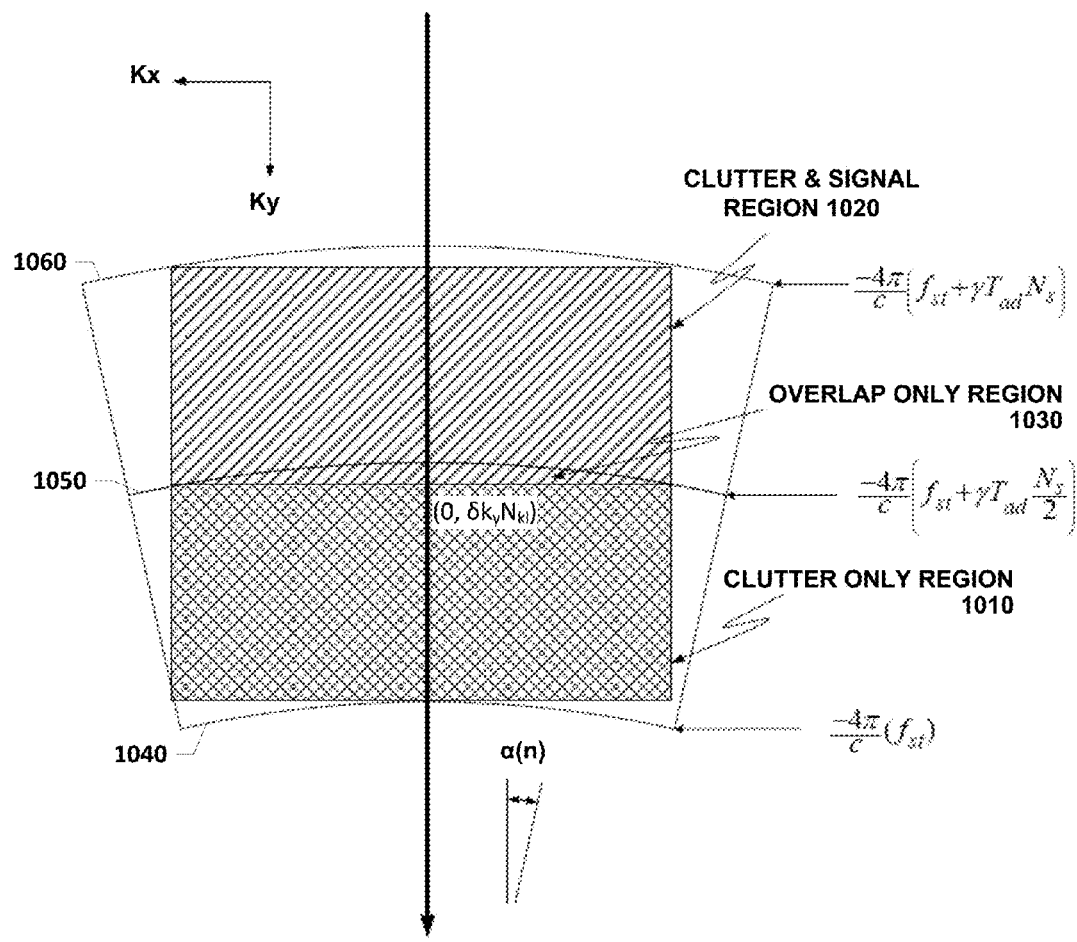
FIG. 10 is a block diagram illustrating an exemplary embodiment of a signal comprising both radar clutter and a communication signal having been processed to form two subapertures.

Two criteria are required when filtering or extracting the subapertures 1010 and 1020. Firstly, as mentioned previously, a first subaperture 1010 contains signal return from only the clutter return while the second subaperture 1020 contains signal return from both the clutter return and the communications signal. Secondly, in an embodiment, the data support for the clutter return should be the same length in both dimensions for both the first subaperture 1010 and the second subaperture 1020. FIG. 10 illustrates two regions that can be extracted as subapertures. The first region 1010 contains mainly clutter return and has a spatial frequency, in the polar grid, that extends from $$\frac{-4\pi}{c}(f_{st})(\text{element 1040})$$

to $$\frac{-4\pi}{c}\left(f_{st} + \gamma T_{ad}\frac{N_s}{2}\right)(\text{element 1050})$$

and the second region 1020 contains both clutter and emitter signal and extend from $$\frac{-4\pi}{c}\left(f_{st} + \gamma T_{ad}\frac{N_s}{2}\right) \text{(element 1050)}$$

to $$\frac{-4\pi}{c}(f_{st} + \gamma T_{ad} N_s) \text{(element 1060)}.$$

The data is filtered in the rectangular grid and thus there is a small overlap area 1030 in the clutter only filter region that contains signal and clutter. This example assumes a brick wall response of the emitter's filter. However, there is typically filter roll-off so this overlap region 1030 can be of little concern.

For the clutter-only data 110, the signal phase can be filtered such that:

$$\theta_1(i,n) = \theta_t(i,n) \text{ for } 0 \le i \le N_{kl} \text{ and } 0 \le n \le N_{Kx}-1 \quad \text{Eqn. 24}$$

and for the clutter-and-signal data 120 the resulting signal phase is:

$$\theta_2(i,n) = \theta_c(i+N_{Kl},n) \text{ for } 0 \le i \le N_{kl} \text{ and } 0 \le n \le N_{Kx}-1 \quad \text{Eqn. 25}$$

The signal return for the first subaperture 1010 is:

$$x_1(i, n) = A_t \exp(j\theta_1(i, n)) \quad \text{for } 0 \le i \le N_{Kl} \text{ and} \quad \text{Eqn. 26}$$
$$= A_t \exp(j(K_y(i)y_s + K_x(n)x_s)) \quad 0 \le n \le N_{Kx} - 1$$

The signal return for the second subaperture 1020 is:

$$x_2(i, n) = A_t \exp(j_t(i+N_{Kl}, n)) + A_c \exp(j\theta_c(i+N_{Kl}, n)) \quad \text{Eqn. 27}$$
$$= A_t \exp(j(K_y(i+N_{Kl})y_s + K_x(n)x_s)) +$$
$$A_c \exp(j(K_y(i+N_{Kl})y_s + K_x(n)x_s))$$

for $0 \le i \le N_{Kl}$ and $0 \le n \le N_{Kx}-1$

The signal, $x_1$, contains only energy from the clutter data 110 while the signal, $x_2$, contains energy from both the clutter signal 110 and the communication signal 120.

Range Compression

This subsection can be read in conjunction with FIG. 6, element 630. For each subaperture 1010 and 1020, a Fourier transform over the $K_y$ dimension can be applied to obtain range compression data per the following:

$$X_1(y, n) = FT\{x_1(i, n)\} \approx A_t \delta(y_s)\exp(jK_x(n)x_s) \quad \text{Eqn. 28}$$

and $$X_2(y, n) = FT\{x_1(i, n)\} \approx \quad \text{Eqn. 29}$$
$$A_c \delta(y_s)\exp(\Theta_C)\exp(jK_x(n)x_s) + A_t \delta(y_s)\exp(jK_x(n)x_s)$$

The spatial sampling in the range dimension is:

$$\delta y = \frac{D_y}{N_{Ky}} \quad \text{Eqn. 30}$$

where:

$$D_y = \frac{2\pi}{\delta k_y} \quad \text{Eqn. 31}$$

The clutter signal energy 110 is now compressed and contained in the row indexed by $y=y_s$. In an embodiment, owing to the range and cross-range dimension of the first subaperture 1010 and the second subaperture 1020 being selected to be equal, the clutter signal for both range compressed data sets can be located in the same row and have the same spatial frequency in the cross-range dimension. The communications signal within $X_2$ is also in the row indexed by $y=y_s$ and has the same spatial frequency as the clutter return in the cross-range dimension. Because the range compressed data, $X_1$, contains only clutter return it can be used to estimate the clutter spectrum in the range compressed data, $X_2$, in the cross-range dimension. Using the clutter spectral estimate from $X_1$, a whitening filter in the cross-range dimension can be implemented, to filter the clutter energy. Removal of the clutter energy can leave residual signaling, whereby the residual signaling can be the communication signal 120, e.g., a preamble signal.

Figure 11:
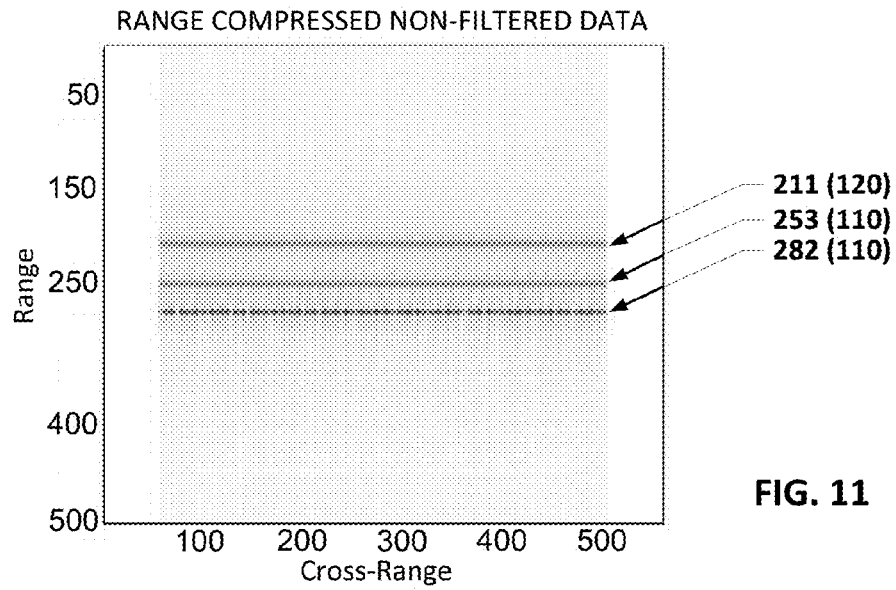
FIG. 11 is a screen capture of range filtering and compression according to an exemplary embodiment.
Figure 12:
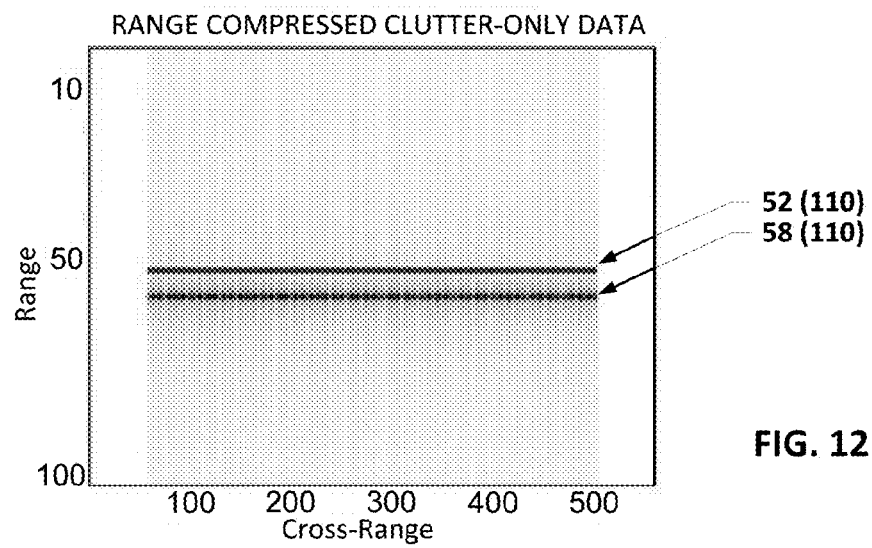
FIG. 12 is a screen capture of range filtering and compression according to an exemplary embodiment.
Figure 13:
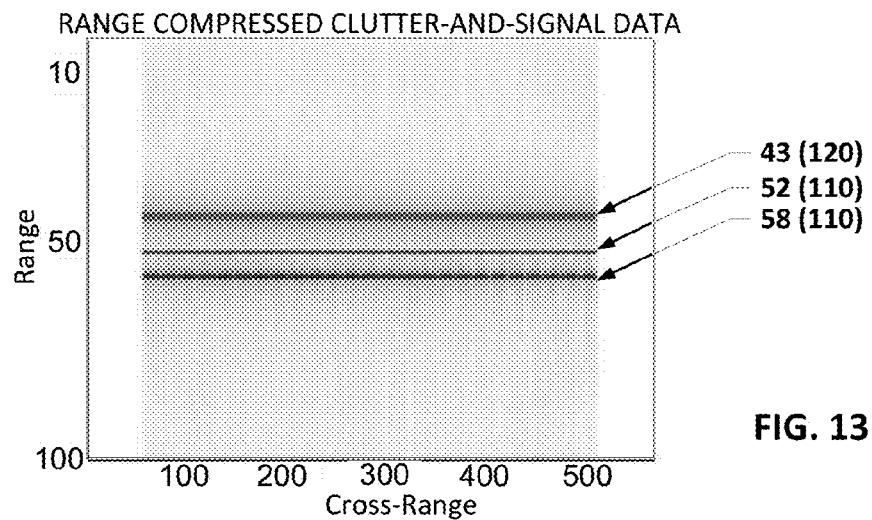
FIG. 13 is a screen capture of range filtering and compression according to an exemplary embodiment.

FIGS. 11-13 illustrate examples of range filtering and range compression according to at least one embodiment. In FIG. 11, the range compressed data of the original non-filtered data is illustrated. In the illustrated example, two simulated radar clutter returns 110 at range bins 253 and 282 and a simulated communication signal 120 at range bin 211 are shown. In the illustrated example, the communication signal 120 has approximately ⅕ the RF bandwidth of the radar clutter returns 110. FIG. 12 illustrates range compressed data for the clutter only subaperture 1010, with clutter-only data 110 being indicated at range bin 52 and range bin 58, while FIG. 13 illustrates the range compressed data for the clutter-and-signal data subaperture 1020, with clutter-only data 110 being indicated at range bin 52 and range bin 58, and further, a communication signal 120 at range bin 43. It is to be noted, in the exemplary embodiment, the total number of range bins has been reduce by ⅕ and the communication signal 120 has been filtered from the clutter-only data 110. For the purpose of illustrating range filtering, in this example the clutter return 110 was not co-located in range with the communication signal 120. Normally, clutter energy 110 would be extant at the same range bin as the communications signal 120 and clutter energy from the clutter-only data 1010 can be used to estimate the clutter energy within the same range bin as the clutter-and-signal data 1020. Spectral estimation and clutter filtering are described in the next two sections.

Spectral Estimation

This subsection can be read in conjunction with FIG. 6, element 640. To perform spectral estimation, for each row in $X_1(y, n)$ a linear predictive coding (LPC) analysis can be applied to determine the set of LPC filter parameters as follows:

$$lpc\_coef(row,:) = lpc(X_1(row,:),N_{lpc}) \quad \text{Eqn. 32}$$

where MATLAB notation indicates that the MATLAB lpc algorithm is applied to each row of $X_1$.

Whitening Filter

This subsection can be read in conjunction with FIG. 6, elements 650 and 655. The resulting filter coefficients, lpc_coef(row,n), can be used with a finite impulse response filter to facilitate estimation and removal of the clutter return from the range compressed data $X_2$ as follows:

$$X_{2\_fil}(\text{row}, n) = X_2(\text{row}, n) - \sum_{k=1}^{N_{lpc}} \text{lpc\_coef}(\text{row}, k) X_2(\text{row}, n-k) \quad \text{Eqn. 33}$$

Further, a whitening filter can be applied to the clutter-only range compressed data 1010. This allows the use of the clutter-only data for constant false alarm processing.

$$X_{1\_fil}(\text{row}, n) = X_1(\text{row}, n) - \sum_{k=1}^{N_{lpc}} \text{lpc\_coef}(\text{row}, k) X_1(\text{row}, n-k) \quad \text{Eqn. 34}$$

Cross-Range Compression

This subsection can be read in conjunction with FIG. 6, elements 660 and 665. For each data set, a Fourier transform operation can be performed over the cross-range dimension as follows:

$$Y_1(y,x) = FT\{X_{1\_fil}(y,n)\} \quad \text{Eqn. 35}$$

$$Y_2(y,x) = FT\{X_{2\_fil}(y,n)\} \quad \text{Eqn. 36}$$

Application of the Fourier transform operation can result in a clutter image, $Y_1$ (y, x) that can comprise of whitened clutter noise and further, an image, $Y_2$ (y, x) that can comprise of whitened clutter noise in combination with a compressed communications signal (e.g., preamble, etc., comprising communication signal 120). In an ideal situation $Y_2$ (y, x) appears as a point response located at $\{x_s, y_s\}$.

Figure 14:
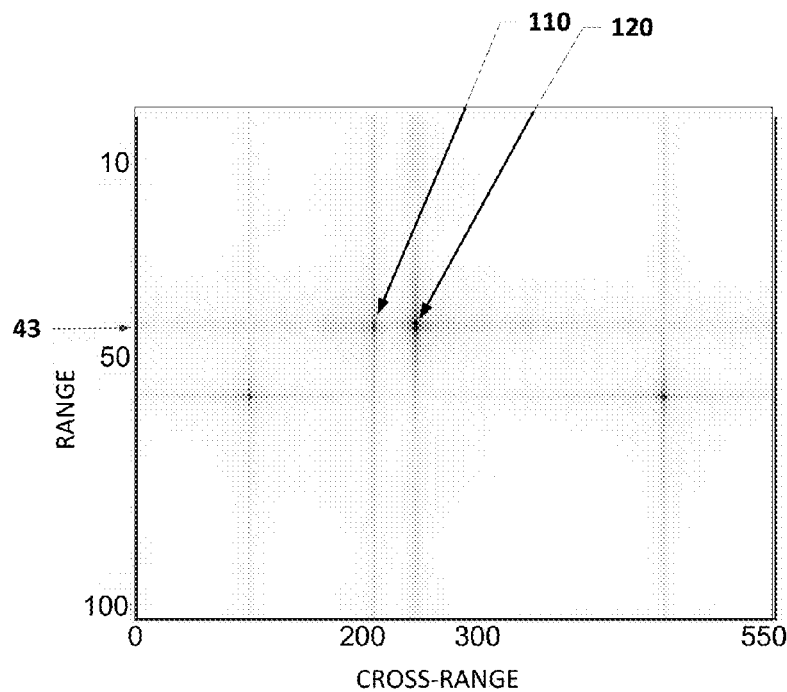
FIG. 14 is a screen capture of range and compression of data according to an exemplary embodiment.

FIG. 14 illustrates an example of range and cross-range compressed data (i.e., SAR image) where radar clutter 110 and communication signal 120 lie within a common range bin. In the example illustrated in FIG. 14, a Fourier transform has been applied in both the range and cross-range dimension. As shown, range bin 43 includes both a response from radar clutter 110 at cross-range bin 208 and a communication signal 120 response at cross-range bin 245.

Figure 15:
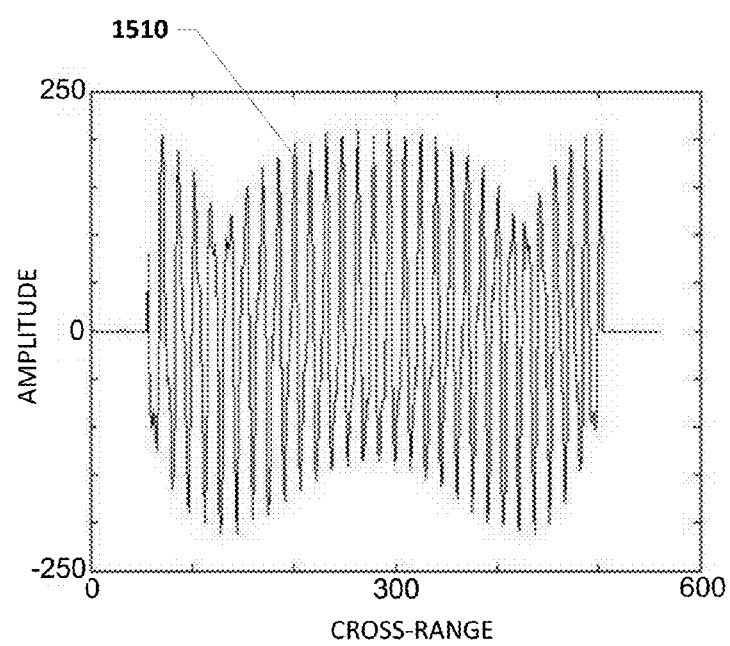
FIG. 15 is a plot of data extraction according to an exemplary embodiment.
Figure 16:
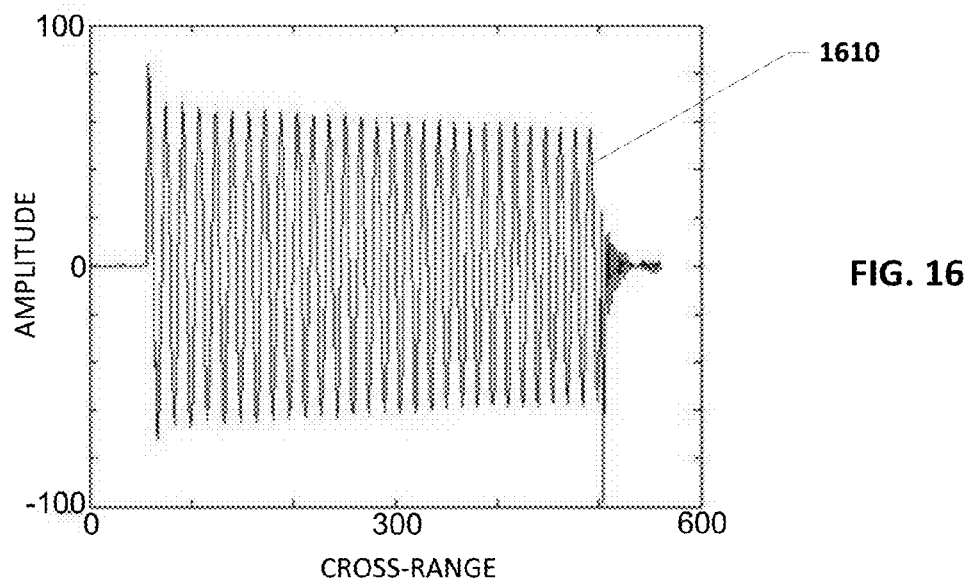
FIG. 16 is a plot of clutter filtering of data according to an exemplary embodiment.

FIG. 15 is a plot of the real part of the data extracted from range bin 43 of the range-compressed data (range-compressed data not shown). Plot 1510 illustrates that that there are two signals (i.e., two tones, each from respective signals 110 and 120) present within range bin 43. The amplitude variation in plot 1510 provides clear indication that there are two separate tones present in the signal. FIG. 16 illustrates the data plot 1510 presented in FIG. 15, after a clutter filter has been applied. As depicted, after application of clutter filtering a signal sinusoidal tone 1610 is evident by the fact that the signal amplitude is no longer varying. Therefore, tone 1610 is a response from only the communication signal 120.

Figure 17:
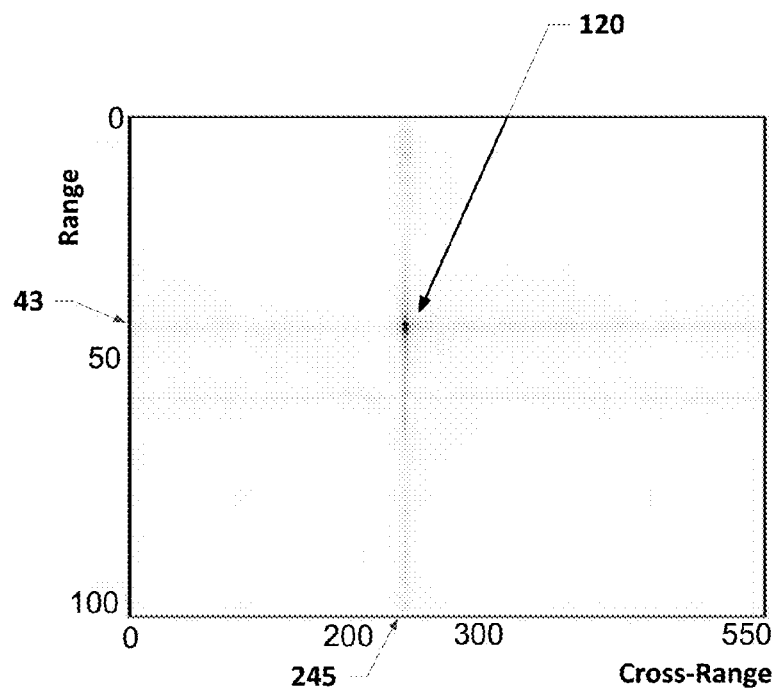
FIG. 17 is a screen capture of a SAR image after clutter filtering of data according to an exemplary embodiment.

FIG. 17 illustrates the resulting SAR image after clutter filtering. As shown in this example, all the clutter signals have been removed and only the communication signal 120 located at range bin 43 and cross-range bin 245 is present.

Owing to application of the whitening filter to the clutter only data, $X_1$, the whitened clutter power in $Y_1$ (y, x) and $Y_2$ (y, x) can be uncorrelated but have equal power. Hence, the resulting data set $Y_1$ (y, x) can be utilized to estimate clutter power in $Y_2$(y, x) and implement a pixel-by-pixel CFAR detector.

Clutter Power Estimation

This subsection can be read in conjunction with FIG. 6, elements 670, 675 and 680. To implement the CFAR detector the clutter power in $Y_1$ (y, x) can be averaged, as follows:

$$\overline{|Y_1(y,x)|^2} = \sum_{k=0}^{N_p-1} |Y_1(y, x+k)|^2 \quad \text{Eqn. 37}$$

where $N_p$ is the number of power detected samples that are averaged.

Preamble Detection

This subsection can be read in conjunction with FIG. 6, elements 690 and 695. The communication signal (e.g., a preamble) can be detected by performing a pixel-by-pixel compression of the two data sets as follows:

$$|Y_2(y,x)|^2 - \overline{|Y_1(y,x)|^2} > \text{threshold} \quad \text{Eqn. 38}$$

The threshold in Eqn. 38 can be chosen to provide the desired false alarm rate for preamble detection.

Finally, because the clutter signal has been whitened in $Y_2$(y, x), the signal detection implemented in Eqn. 38 can discriminate uniquely between the communication signal 120 and the radar clutter 110 of a normal radar image (i.e., an image where the clutter filter has not been applied).

Figure 18:
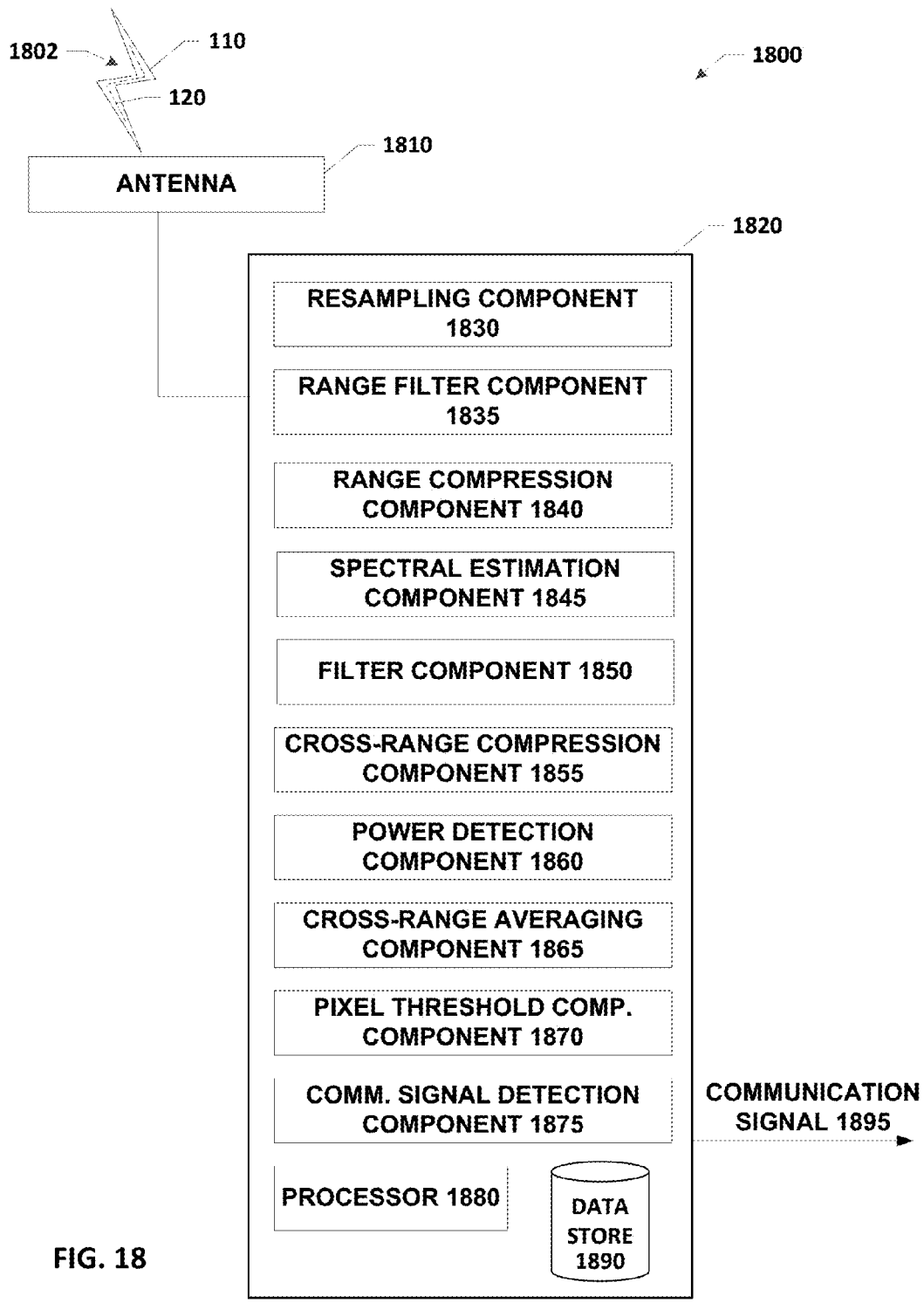
FIG. 18 is a block diagram illustrating an exemplary system for detecting and extracting a communication signal.

FIG. 18 illustrates an antenna system 1800 according to an embodiment. As previously described, a communication signal can be extracted from received signaling comprising a combination of radar clutter and the communication signal. As illustrated, a received signal 1802 can be received at an antenna 1810. In an embodiment, the received signal 1802 can comprise of radar clutter 110 and further, a communication signal 120 (e.g., a preamble, etc.). Antenna 1810 is communicatively coupled with signal detection system 1820 which comprises a plurality of components as required to facilitate operation of one or more embodiments as presented herein. As presented herein with particular reference to FIGS. 6-15, a number of operations can be performed to facilitate extraction of the communication signal 120 from radar clutter 110.

A resampling component 1830 can be utilized to transform a received signal 1802 from polar form to rectangular form (e.g., phase history data), per 610 of FIG. 6.

A range filter component 1835 can be utilized to filter the transformed received signal 1802 to facilitate generation of a first subaperture and a second subaperture, per 620 of FIG. 6. As previously mentioned, the first subaperture can comprise of only radar clutter (e.g., only comprises a portion of radar clutter 110—FIG. 6, dataset R) and the second subaperture can comprise of radar clutter and a communication signal (e.g., comprises a portion of radar clutter 110 and communication signal 120—FIG. 6, dataset S). In an embodiment, filtering can be performed in the range dimension.

A range compression component 1840 can be utilized to apply a Fourier transform to dataset R and further to dataset S to generate range compressed data, per 630 of FIG. 6. In an embodiment, the Fourier transform can be applied in the range dimension.

A spectral estimation component 1845 can be utilized to determine the degree and nature of the radar clutter 110 in dataset R, per 640 of FIG. 6. Based upon the determination, the degree and nature of the portion of radar clutter 110 in dataset S can be estimated. In an embodiment, the spectral estimation determination can be performed in the cross-range dimension.

A filter component 1850 can be applied to the dataset R signaling and the dataset S signaling, per 650 and 655 of FIG. 6. In an embodiment, filtering can be a whitening filter. In another embodiment, the filtering can be applied in the cross-range dimension.

A cross-range compression component 1855 can be applied to the dataset R and the dataset S, where the data can be compressed in the cross-range, per 660 and 665 of FIG. 6. As part of the cross-range compression a Fourier transform can be applied to both the dataset R and the dataset S to facilitate creation of two respective SAR images, a first SAR image for the R dataset and a second SAR image for the S dataset.

A power detection component 1860 can be utilized to detect respective powers comprising the first SAR image and the second SAR image per 670 and 675 of FIG. 6.

A cross-range averaging component 1865 can be utilized to facilitate averaging of the clutter-only power in the first SAR image per 680 of FIG. 6. In an embodiment, averaging can be in the cross-range dimension.

A pixel threshold component 1870 can be utilized, to compare pixel to pixel between the power-averaged clutter-only first SAR image and the power detected clutter-and-signal second SAR image, per 690 of FIG. 6. Based upon the comparison, existence of a communication signal 120 (e.g., residual data or signal residue in the second SAR versus the first SAR) in the second SAR image can be determined. Accordingly, the communication signal 120 can be extracted from the radar clutter 110 comprising the second SAR image. Based on the extraction, the communication signal 120, or information pertaining thereto can be identified as communication signal 1895 per 695 of FIG. 6. As previously mentioned, communication signal 120 can comprise of a preamble signal, at least one data symbol, etc.

As illustrated in FIG. 18, the various components 1830-1875 can be operated in accordance with operation of a processor 1880 and a data store 1890. In an embodiment, processor 1880 can facilitate execution of one or more components 1830-1875. Further, data store 1890 can store one or more received signals 1802, one or more extracted communication signals 120, radar clutter information 110, or any other pertinent information/data to be stored to facilitate operation of one or more embodiments as presented herein.

Figure 19:
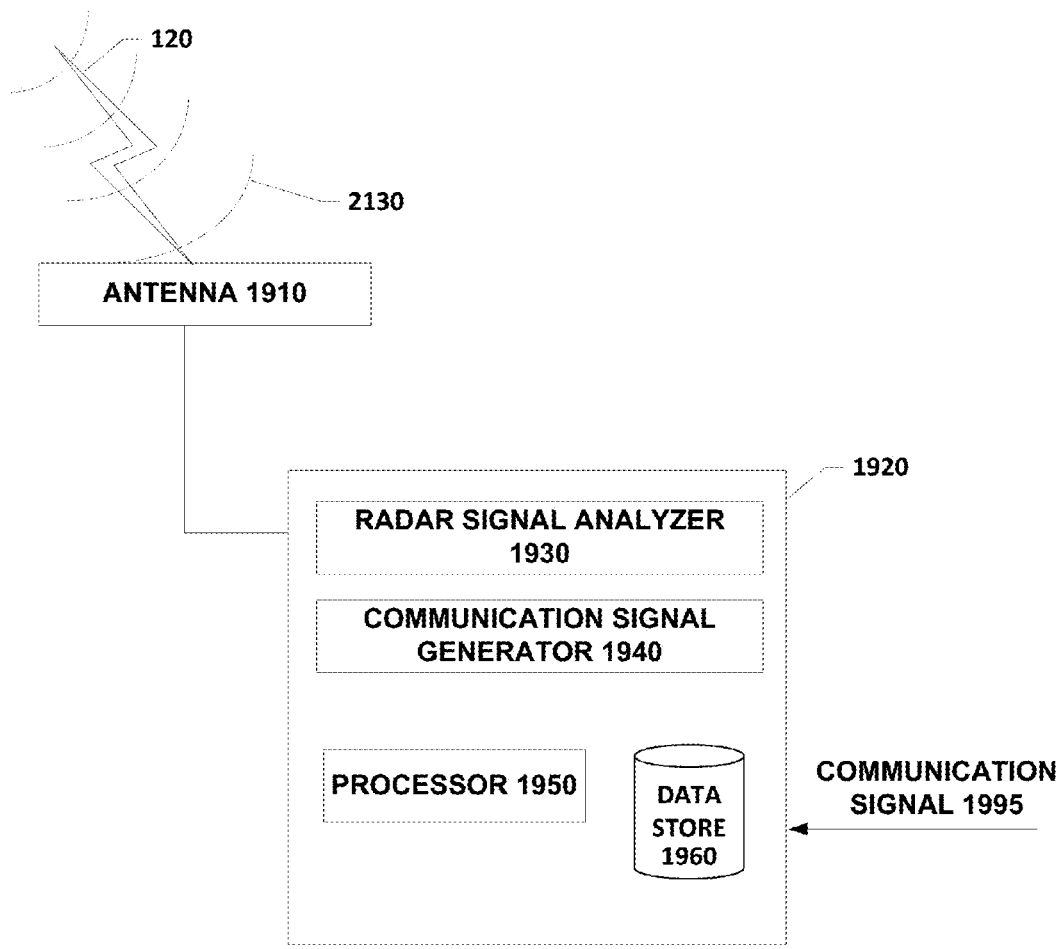
FIG. 19 is a block diagram illustrating an exemplary system for generating a communication signal.

FIG. 19 illustrates an antenna system 1900 according to an embodiment. As previously described, a communication signal can be extracted from received signaling comprising a combination of radar clutter and the communication signal. In an embodiment, a communication signal 120 can be transmitted based upon one or more parameters relating to a radar signal 2130 being received at an antenna 1910. Communication system 1920 can be utilized to receive the radar signal 2130, determine the one or more parameters pertinent to the radar signal 2130 and based thereon, configure a communication signal 1995 for transmission in accord with the radar signal 2130. In an embodiment, communication system 1920 can include a radar signal analyzer component 1930 which can be configured to receive the radar signal 2130 from antenna 1910 and perform one or more operations to quantify the radar signal 2130. As previously mentioned, the communication system 1920 can be RF band limited and hence configures the communication signal 1995 to be generated in accordance with the frequency (e.g., center frequency and chirp rate) of the radar signal 2130. The radar signal analyzer component 1930 can be configured to identify the frequency of the radar signal 2130 and any other information, e.g., the bandwidth of the radar signal 2130.

Based on the analysis generated by the radar signal analyzer component 1930, a communication signal generator component 1940 can be configured to receive a communication signal 1995 which is to be transmitted (e.g., via antenna 1910) and further configure the communication signal in accord with the radar signal 2130. For example, based upon the frequency of the radar signal 2130 the communication signal 1995 can be configured to be transmitted such that the communication signal 1995 is being transmitted at the same time as reflection of the radar signal 2130. Hence, as shown in FIGS. 1, 2, 8 and 9, the communication signal 120 is transmitted in conjunction with a clutter signal (e.g., clutter signal 110).

As illustrated in FIG. 19, components 1930 and 1940 can be operated in accordance with operation of a processor 1950 and a data store 1960. In an embodiment, processor 1950 can facilitate execution of either or both components 1930 and 1940. Further, data store 1960 can store information relating to one or more received radar signals 2130, one or more communication signals 1995, or any other pertinent information/data to be stored to facilitate operation of one or more embodiments as presented herein.

Figure 20:
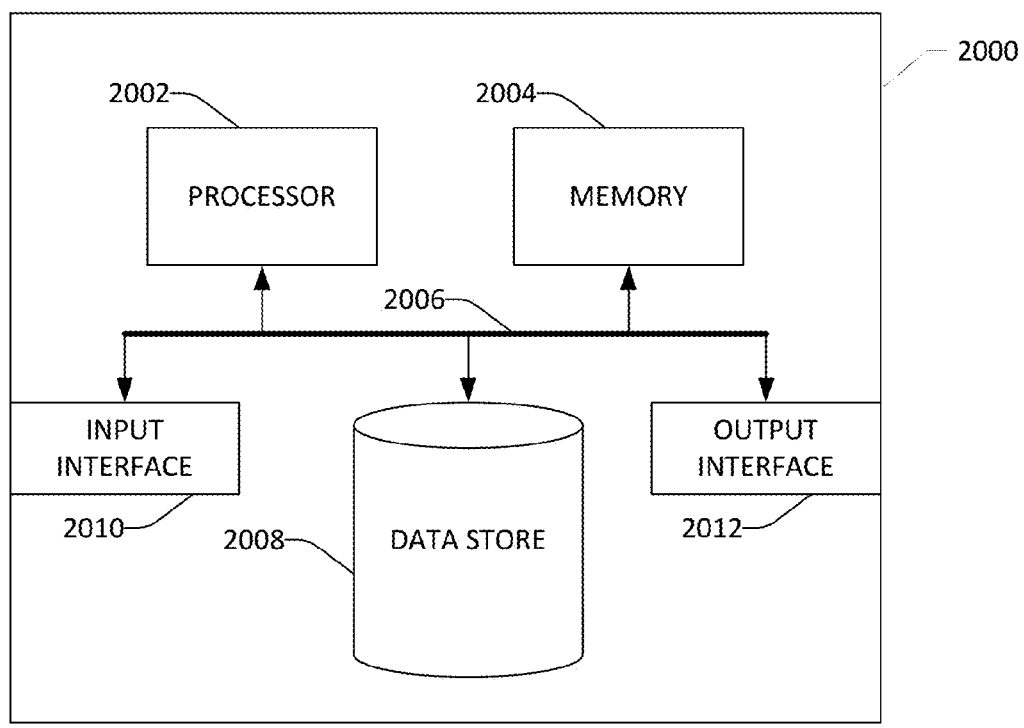
FIG. 20 illustrates an exemplary computing device.

Referring now to FIG. 20, a high-level illustration of an exemplary computing device 2000 that can be used in accordance with the systems and methodologies disclosed herein is illustrated. For instance, the computing device 2000 may be used in a system to determine existence of a communication signal in a received signal, wherein the received signal further comprises radar clutter signaling. The computing device 2000 includes at least one processor 2002 that executes instructions that are stored in a memory 2004. The instructions may be, for instance, instructions for implementing functionality described as being carried out by one or more components discussed above or instructions for implementing one or more of the methods described above. The processor 2002 may access the memory 2004 by way of a system bus 2006. In addition to storing executable instructions, the memory 2004 may also store operating parameters, required operating parameters, and so forth.

The computing device 2000 additionally includes a data store 2008 that is accessible by the processor 2002 by way of the system bus 2006. The data store 2008 may include executable instructions, operating parameters, required operating parameters, etc. The computing device 2000 also includes an input interface 2010 that allows external devices to communicate with the computing device 2000. For instance, the input interface 2010 may be used to receive instructions from an external computer device, from a user, etc. The computing device 2000 also includes an output interface 2012 that interfaces the computing device 2000 with one or more external devices. For example, the computing device 2000 may display text, images, etc., by way of the output interface 2012.

Additionally, while illustrated as a single system, it is to be understood that the computing device 2000 may be a distributed system. Thus, for instance, several devices may be in communication by way of a network connection and may collectively perform tasks described as being performed by the computing device 2000.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
    receiving a signal at a receiver, the signal comprises:
        a communication signal transmitted by a band-limited radio frequency (RF) transmitter; and
        radar clutter, the radar clutter based upon a radar signal transmitted by a radar transmitter, wherein a first portion of the signal comprises a first portion of the radar clutter and a second portion of the signal comprises a second portion of the radar clutter and the communication signal, wherein the communication signal is band-limited by the band-limited RF transmitter according to at least one parameter associated with the radar clutter; and
    extracting the communication signal from the signal, wherein extracting the communication signal comprises,
        identifying the first portion of the radar clutter;
        identifying the second portion of the radar clutter based upon the first portion of the radar clutter; and
        identifying the communication signal in the signal based upon the identifying of the first portion of the radar clutter and the second portion of the radar clutter.

2. The method of claim 1, wherein extracting the communication signal from the signal further comprises:
    converting the first portion of the radar clutter to a rectangular array forming a first subaperture; and
    converting the communication signal and the second portion of the radar clutter to a rectangular array forming a second subaperture, wherein the first subaperture and the second subaperture having the same area.

3. The method of claim 2, wherein extracting the communication signal from the signal further comprises:
    determining a radar signature of the first subaperture.

4. The method of claim 3, wherein extracting the communication signal from the signal further comprises:
    filtering the second subaperture with the radar signature of the first subaperture leaving a signal residue, wherein the signal residue is the communication signal.

5. The method of claim 1, wherein the communication signal comprises at least one of a preamble, a data symbol, or communication data.

6. The method of claim 1, wherein the communication signal has a shorter duration than the duration of the radar clutter.

7. The method of claim 1, wherein a bandwidth of the communication signal is less than a bandwidth of the radar clutter.

8. The method of claim 1, wherein the radar clutter being based at least in part on linear frequency modulation.

9. A system comprising:
    a signal detection system configured to:
        receive a signal comprising a combination of a communication signal and radar clutter, the communication signal transmitted by a band-limited radio frequency (RF) transmitter, the radar signal transmitted by a radar transmitter, wherein the band-limited RF transmitter band-limits the communication signal in accordance with a frequency of the radar signal, and further wherein a first portion of the received signal comprises a first portion of the radar clutter, and a second portion of the received signal comprises a second portion of the radar clutter and the communication signal;
        identify the first portion of the radar clutter in the received signal;
        identify the second portion of the radar clutter in the received signal based upon the first portion of the radar clutter; and
        extract the communication signal from the received signal in response to the first portion and the second portion of the radar clutter being identified in the received signal.

10. The system of claim 9, wherein the signal detection system is further configured to:
    convert the received signal from a polar format to a rectangular grid having an X dimension and a Y dimension.

11. The system of claim 10, wherein the signal detection system is further configured to:

separate the rectangular grid into two equally sized regions, a first region being a first subaperture comprising the first portion of the radar clutter and a second region being a second subaperture comprising the second portion of the radar clutter and the communication signal.

12. The system of claim 11, wherein the signal detection system is further configured to:
determine a radar signature of the first portion of the radar clutter.

13. The system of claim 12, wherein the signal detection system is further configured to:
extract the radar signature from the second subaperture, wherein the residue signal comprising the communication signal.

14. The system of claim 9, wherein a bandwidth of the communication signal is configured in accordance with at least one parameter associated with the radar clutter.

15. The system of claim 9, wherein the communication signal has a duration one half the duration of the radar clutter.

16. The system of claim 9, wherein the communication signal comprises at least one of a preamble, a data symbol, or communication data.

17. The system of claim 9, wherein the radar clutter being based at least in part on a chirp modulation of the radar signal.

18. A radar system comprising a memory that includes instructions that, when executed by a processor of the radar system, cause the processor to perform acts comprising:
receiving a signal, the signal comprising;
radar clutter that is based upon a radar signal transmitted by a radar transmitter, and
a communication signal transmitted by a band-limited radio frequency (RF) transmitter, wherein the band-limited RF transmitter band-limits the communication signal as a function of at least one parameter of the radar clutter;
generating a first subaperture comprising a first portion of the radar clutter;
generating a second subaperture comprising the communication signal and a second portion of the radar clutter, wherein the first subaperture has a same area as the second subaperture;
determining a signature of the first portion of the radar clutter;
filtering the second subaperture with the signature of the first portion to facilitate removal of the second portion of the radar clutter from the second subaperture; and
acquiring the communication signal in the second subaperture based upon removing the second portion of the radar clutter from the second subaperture.

19. The radar system of claim 18, wherein the communication signal comprising at least one of a preamble, a data symbol, or communication data.

20. The radar system of claim 18, wherein the communication signal has half of the duration of the radar signal.

* * * * *